(12) United States Patent
Alrasheed et al.

(10) Patent No.: US 12,194,514 B2
(45) Date of Patent: Jan. 14, 2025

(54) PIPELINE PIG WITH RETRACTABLE SCRAPER

(71) Applicant: SAUDI ARABIAN OIL COMPANY, Dhahran (SA)

(72) Inventors: Faisal Alrasheed, Ad Dammam (SA); Tao Chen, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 308 days.

(21) Appl. No.: 17/949,686

(22) Filed: Sep. 21, 2022

(65) Prior Publication Data

US 2024/0091827 A1    Mar. 21, 2024

(51) Int. Cl.
| | |
|---|---|
| *B08B 9/055* | (2006.01) |
| *B08B 9/00* | (2006.01) |
| *B08B 9/04* | (2006.01) |
| *F16L 55/28* | (2006.01) |
| *F16L 55/40* | (2006.01) |

(Continued)

(52) U.S. Cl.
CPC .............. *B08B 9/0553* (2013.01); *B08B 9/00* (2013.01); *B08B 9/04* (2013.01); *B08B 9/055* (2013.01); *B08B 9/0551* (2013.01); *F16L 55/28* (2013.01); *F16L 55/40* (2013.01); *F16L 55/48* (2013.01); *F16L 2101/30* (2013.01)

(58) Field of Classification Search
CPC .. B08B 9/00; B08B 9/027; B08B 9/04; B08B 9/053; B08B 9/055; B08B 9/0551; B08B 9/0553; B08B 9/0557; B08B 2209/04; B08B 2209/053; B08B 2209/055; B08B 2209/0553; F16L 55/26; F16L 55/28; F16L 55/38; F16L 55/40; F16L 55/44; F16L 55/48; F16L 2101/12; F16L 2101/30

See application file for complete search history.

(56) References Cited

U.S. PATENT DOCUMENTS

| | | | |
|---|---|---|---|
| 3,539,915 A | * | 11/1970 | Wood ................ G01N 27/904 |
| | | | 324/220 |
| 3,576,043 A | | 4/1971 | Zongker |
| 3,837,214 A | | 9/1974 | Guest |

(Continued)

FOREIGN PATENT DOCUMENTS

| | | | | |
|---|---|---|---|---|
| CA | 2367521 C | * | 2/2009 | ............. B08B 9/049 |
| EP | 0698423 B1 | * | 1/1999 | |
| KR | 102122676 B1 | * | 6/2020 | |

*Primary Examiner* — Randall E Chin
(74) *Attorney, Agent, or Firm* — Bracewell LLP; Constance G. Rhebergen; Keith R. Derrington

(57) ABSTRACT

Systems and methods for cleaning an internal bore of a tubular member with a pipeline pig include a pipeline pig having a pig body with a fore end and an aft end opposite the fore end. A cup circumscribes the pig body, where an outer diameter lip of the cup engages a surface of the internal bore of the tubular member. A scraper assembly includes a scraper arm extending radially outward from the pig body and a spring biasing the scraper arm in a radially outward direction. A load cell is positioned to measure a movement of the scraper arm in a radially inward direction. A treatment trigger is actuated by a treatment signal from the load cell to deliver a treatment system to the internal bore of the tubular member, where the treatment signal is generated by the movement of the scraper arm in the radially inward direction.

20 Claims, 3 Drawing Sheets

(51) Int. Cl.
  *F16L 55/48*  (2006.01)
  *F16L 101/30*  (2006.01)

(56) References Cited

U.S. PATENT DOCUMENTS

| | | |
|---|---|---|
| 4,964,059 A | 10/1990 | Sugaya et al. |
| 6,065,174 A | 5/2000 | Laymon |
| 6,173,469 B1 | 1/2001 | Laymon |
| 7,698,937 B2 | 4/2010 | Neidhardt |
| 9,662,690 B2 | 5/2017 | Farzan et al. |
| 11,306,860 B2 | 4/2022 | Xiong et al. |
| 2007/0161339 A1 | 7/2007 | Wentworth et al. |
| 2015/0090459 A1 | 4/2015 | Cain et al. |

* cited by examiner

PIPELINE PIG WITH RETRACTABLE SCRAPER

BACKGROUND OF THE DISCLOSURE

1. Field of the Disclosure

The disclosure relates generally to a pipeline pig for scaping an inner surface of a bore of the pipeline, and in particular, to systems and methods for removing a deposit from the inner surface of the bore of the pipeline with biased scrapers of the pipeline pig.

2. Description of the Related Art

The buildup of deposit, such as mineral scale or other hardened materials within the bore of a tubular member will restrict the flow of fluids through such tubular member by narrowing the internal diameter of the tubular member. The buildup of deposit within a pipe line or other flow line can reduce production by inhibiting or restricting the fluid flow pathways. Challenges caused by the buildup of deposit includes a reduction in flow assurance, a reduction in production and injection capabilities for processes associated with the tubular member, equipment damage and hindrance, and requirements for workover and remediation operations.

A current technique for inspecting and treating a buildup of deposits within a tubular member includes the us of a pipeline pig. The pipeline pig can be propelled by the pressure of the product flow inside the pipelines or it can be pushed mechanically or electrically.

SUMMARY OF THE DISCLOSURE

Some currently available pipeline pigs get stuck in the tubular member when encountering large amounts of, or large sized, deposits. When deposits are formed within the tubular members, the layers of deposit can accumulate and the thickness of the deposits can increase. If the deposits are sufficiently thick or has high hardness, a scraper of the pipeline pig can be stuck in the tubular member. In certain industries, such as the hydrocarbon industry, the tubular members can be very long pipelines that are transporting fluids. Such pipelines can exceed thousands of kilometers. If the pipeline pig is stuck in a lengthy pipeline, determining the exact location is very critical to remedy the blockage and avoid significant production loss and high treatment cost. Alternately, if the deposits are sufficiently thick or has high hardness, a scraper of the pipeline pig can break off.

Embodiments disclosed herein provide systems and methods for removing deposits from within a tubular member with a retractable scraper. The scraper is part of a lever that is biased radially outward with a spring. If the deposit is hard or thick, the spring will allow the scraper to retract so that the pipeline pig can move past such hard or thick deposit without becoming stuck or breaking the scraper. When the scraper is moved radially inward, a load cell can trigger a treatment. The load cell can alternately signal a global positioning system to identify the position of the pipeline pig within the tubular member.

In an embodiment of this disclosure a pipeline pig for traveling through a tubular member includes a pig body. The pig body is sized to fit within an internal bore of the tubular member. The pig body further has a fore end pointed in a direction of travel through the tubular member, and an aft end opposite the fore end. A cup circumscribes the pig body. An outer diameter lip of the cup is sized to engage a surface of the internal bore of the tubular member. A scraper assembly circumscribes the pig body. The scraper assembly has a scraper arm extending radially outward from the pig body. A spring biases the scraper arm in a radially outward direction. A load cell is positioned to measure a movement of the scraper arm in a radially inward direction. A treatment trigger is actuated by a treatment signal from the load cell to deliver a treatment system to the internal bore of the tubular member. The treatment signal from the load cell is generated by the movement of the scraper arm in the radially inward direction.

In alternate embodiments, the scraper assembly can further include a global positioning system. The global positioning system can be operable to identify a position of the pipeline pig within the tubular member. The global positioning system can identify the position of the pipeline pig within the tubular member by a positioning signal from the load cell. The positioning signal from the load cell can be generated by the movement of the scraper arm in the radially inward direction.

In other alternate embodiments, a second cup can circumscribe the pig body, where an outer diameter lip of the second cup can be sized to engage the surface of the internal bore of the tubular member. The scraper assembly can be positioned between the cup and the second cup. Alternately, the scraper assembly can be positioned aft of both the cup and the second cup. The scraper arm can have a curved shape. A leading edge of the scraper arm can be pointed in a forward direction and can have a scraper blade. The scraper arm can include a wheel located at the leading edge of the scraper arm.

In yet other alternate embodiments, the treatment system can include a chemical positioned on the pipeline pig. The chemical can be operable to reduce a deposit within the internal bore of the tubular member. Alternately, the treatment system can include a mechanical device positioned on the pipeline pig. The mechanical device can be operable to reduce a deposit within the internal bore of the tubular member. The mechanical device can be a brush or mill that is operable to extend to the surface of the internal bore of the tubular member.

In an alternate embodiment of this disclosure, a method for cleaning an internal bore of a tubular member with a pipeline pig includes delivering the pipeline pig into the internal bore of the tubular member. The pipeline pig has a pig body sized to fit within the internal bore of the tubular member. A fore end of the pig body is pointed in a direction of travel through the tubular member. The pig body has an aft end opposite the fore end. A surface of the internal bore of the tubular member is engaged with an outer diameter lip of a cup that circumscribes the pig body. A deposit within the internal bore of the tubular member is removed with a scraper assembly that circumscribes the pig body. The scraper assembly has a scraper arm extending radially outward from the pig body. A spring biases the scraper arm in a radially outward direction. A load cell is positioned to measure a movement of the scraper arm in a radially inward direction. A treatment trigger is actuated by a treatment signal from the load cell to deliver a treatment system to the internal bore of the tubular member, where the treatment signal from the load cell is generated by the movement of the scraper arm in the radially inward direction.

In alternate embodiments, the scraper assembly can further include a global positioning system. The global positioning system can identify a position of the pipeline pig within the tubular member. The global positioning system can identify the position of the pipeline pig within the tubular member by a positioning signal from the load cell. The positioning signal from the load cell can be generated by the movement of the scraper arm in the radially inward direction.

In other alternate embodiments, a second cup can circumscribe the pig body and an outer diameter lip of the second cup can engage the surface of the internal bore of the tubular member. The method can further include positioning the scraper assembly between the cup and the second cup. Alternately, the method can further include positioning the scraper assembly aft of both the cup and the second cup. The scraper arm can have a curved shape, and the method can further include pointing a leading edge of the scraper arm in a forward direction. The leading edge can have a scraper blade. The scraper arm can include a wheel located at the leading edge of the scraper arm and the method can further include engaging the surface of the internal bore of the tubular member with the wheel.

In yet other alternate embodiments, the treatment system can include a chemical positioned on the pipeline pig. The chemical can reduce the deposit within the internal bore of the tubular member when the chemical is released into the internal bore of the tubular member. Alternately, the treatment system can include a mechanical device positioned on the pipeline pig. The mechanical device can reduce the deposit within the internal bore of the tubular member when the treatment system is delivered to the internal bore of the tubular member. The mechanical device can be a brush or mill that extends to the surface of the internal bore of the tubular member.

BRIEF DESCRIPTION OF THE DRAWINGS

So that the manner in which the above-recited features, aspects, and advantages of the embodiments of this disclosure, as well as others that will become apparent, are attained and can be understood in detail, a more particular description of the disclosure briefly summarized above may be had by reference to the embodiments thereof that are illustrated in the drawings that form a part of this specification. It is to be noted, however, that the appended drawings illustrate only preferred embodiments of the disclosure and are, therefore, not to be considered limiting of the disclosure's scope, for the disclosure may admit to other equally effective embodiments.

DETAILED DESCRIPTION

Embodiments of the present disclosure will now be described more fully hereinafter with reference to the accompanying drawings, which illustrate embodiments of the disclosure. Systems and methods of this disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments or positions.

In the following discussion, numerous specific details are set forth to provide a thorough understanding of the present disclosure. However, it will be obvious to those skilled in the art that embodiments of the present disclosure can be practiced without such specific details. Additionally, for the most part, details concerning well drilling, reservoir testing, well completion and the like have been omitted inasmuch as such details are not considered necessary to obtain a complete understanding of the present disclosure, and are considered to be within the skills of persons skilled in the relevant art.

Figure 1:
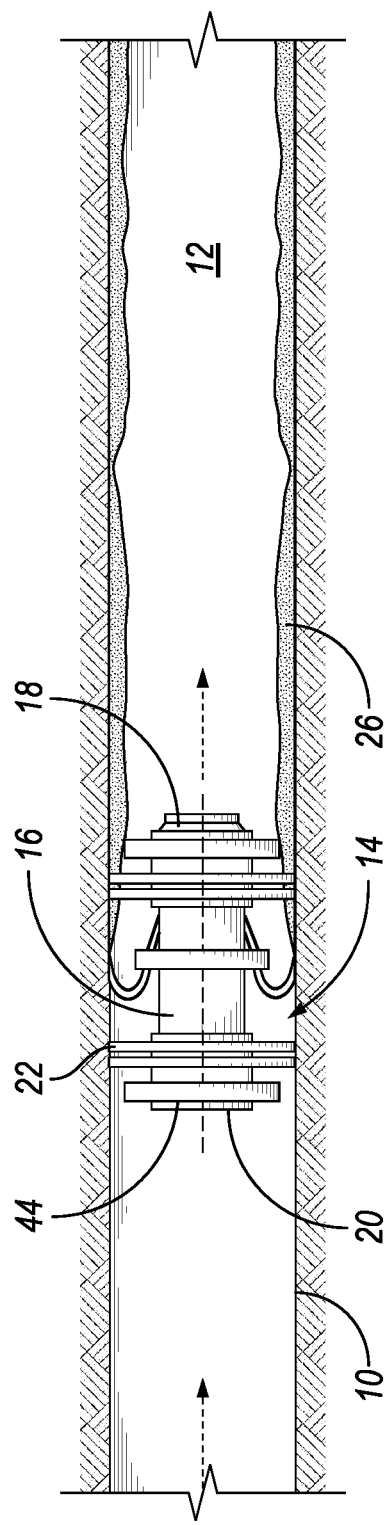
FIG. 1 is a schematic section view of a pipeline pig located within an internal bore of a tubular member, in accordance with an embodiment of this disclosure.

Looking at FIG. 1, tubular member 10 can be a pipeline that is used in the hydrocarbon industry, the petrochemical industry, in manufacturing facilities, chemical plants, or other industry that uses pipelines to transport fluids. Tubular member 10 has internal bore 12 that is used to transport fluids. Pipeline pig 14 is positioned within internal bore 12 of tubular member 10.

Pipeline pig 14 includes pig body 16. Pig body 16 is sized to fit within internal bore 12 of tubular member 10. Pig body 16 has fore end 18 that points in a direction of the travel of pipeline pig 14 through tubular member 10. Pig body 16 has aft end 20 that is opposite fore end 18.

Cup 22 circumscribes pig body 16. Outer diameter lip 24 (FIGS. 2-3) of cup 22 is sized to engage a surface of internal bore 12 of tubular member 10. Cup 22 can be formed of a flexible material that can substantially seal against the surface of the internal bore 12 of tubular member 10. Cup 22 can be sufficiently flexible to pass over deposits 26 that form on the surface of internal bore 12 of tubular member 10.

In the example embodiment of FIG. 1, cup 22 is ring shaped and there are two pairs of cups 22. In the example embodiments of FIGS. 2-3, there are a first cup and a second cup, each cup 22 having a portion that is frusto conical in shape.

Outer diameter lip 24 of cup 22 can be sufficiently stiff to remove a certain amount of deposits 26. However, cup 22 may not remove deposit 26 that is hard or thick. Scraper assembly 28 is included as part of pipeline pig 14 in order to remove certain of deposits 26 that are not removed by cup 22.

Figure 2:
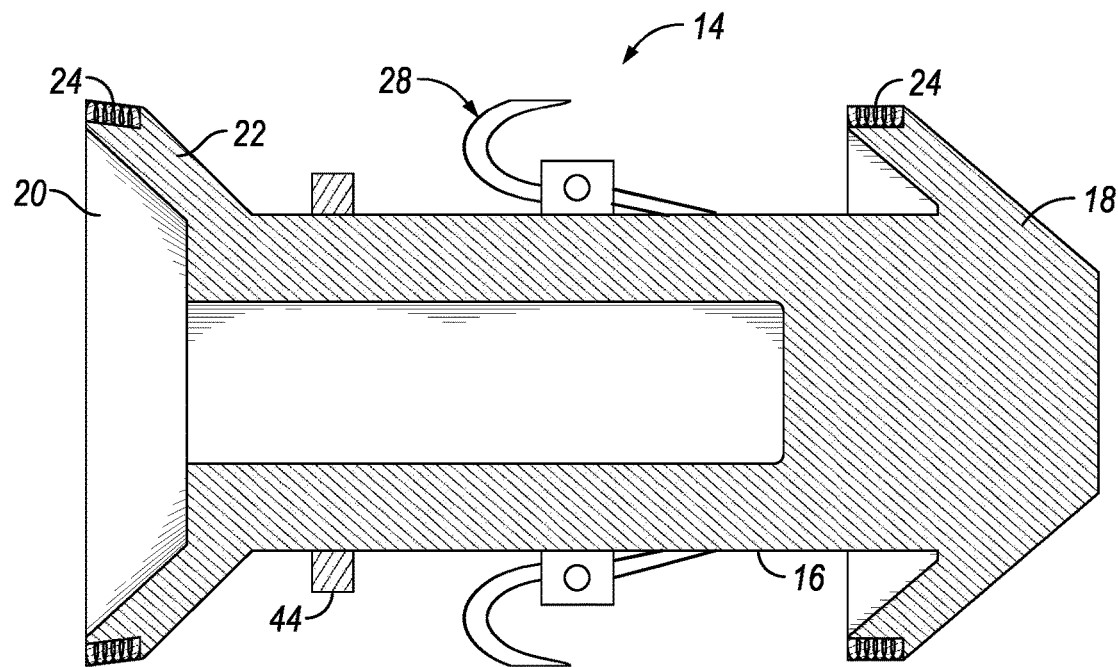
FIG. 2 is a section view of a pipeline pig, in accordance with an embodiment of this disclosure.

In the example embodiment of FIG. 2, scraper assembly 28 is positioned between a first and second cup 22. In the example embodiment of FIG. 3, scraper assembly 28 is positioned aft of both the first and second cups 22. In alternate embodiments, there can be more than one scraper assembly 28 and a scraper assembly 28 can be positioned both between first and second cups 22, and aft of both first and second cups 22. In other alternate embodiments, scraper assembly 28 can be part of lip 24 of cup 22.

Figure 4:
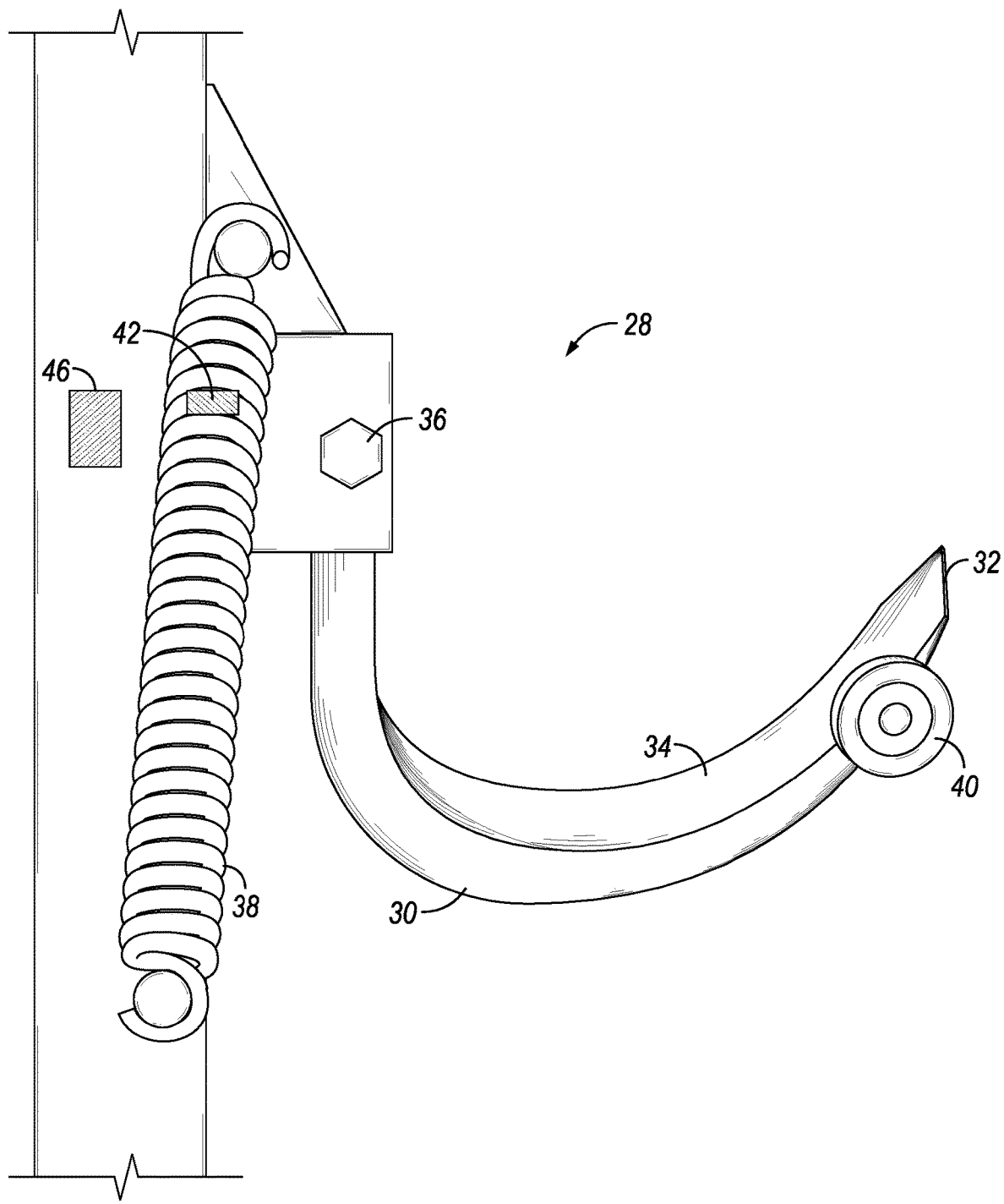
FIG. 4 is a section view of a scraper assembly of a pipeline pig, in accordance with an alternate embodiment of this disclosure.

Looking at FIG. 4, scraper assembly 28 includes scraper arm 30. Scraper arm 30 extends radially outward from pig body 16. Scraper arm 30 has a curved shape. A leading edge 32 of scraper arm 30 is pointed in a forward direction. Scraper arm 30 can include scraper blade 34. Scraper blade 34 can be integrally formed with scraper arm 30. Alternately, scraper blade 34 can be a separate member that is secured to scraper arm 30. Although only two scraper arms 30 are shown in the example embodiments, such representation is for clarity only. In embodiments of this disclosure, scraper assembly 28 circumscribes pig body 16. Scraper assembly 28 can be a ring shaped assembly. A plurality of scraper arms are spaced around an outer circumference of pig body 16.

Scraper arm 30 can function as a lever that is rotatable about pin 36. Spring 38 biases scraper arm 30 in a radially outward direction. Spring 38 can maintain scraper blade 34 in contact with deposit 26. Wheel 40 can be located along scraper arm 30 proximate to or at leading edge 32. Wheel 40 can be used to guide scraper blade 34 along the surface of internal bore 12. Wheel 40 can prevent scraper blade 34 from directly contacting the surface of internal bore 12 so that scraper blade 34 does not damage the surface of internal bore 12. In alternate embodiments, a brush can be used in place of, or in addition to, wheel 40.

When scraper blade 34 encounters thick or hard deposit 26, scraper arm 30 can pivot so that the leading edge 32 of scraper blade 34 rotates radially inward. In this way, scraper blade 34 will not be damaged. In addition, scraper blade 34 will not become hung up on the deposit 26, causing the pipeline pig 14 to become stuck within tubular member 10.

Load cell 42 can measure movement of scraper arm 30 in the radially inward direction. Load cell 42 can be, for example, a strain gauge load cell, a piezoelectric load cell, a pneumatic load cell, a hydraulic load cell, or other known type of load cell. As scraper blade 34 pivots radially inward when encountering thick or hard deposit 26, load cell 42 can assist in preventing the breaking of scraper arm 30 by allowing for the retraction of scraper blade 34.

When movement of scraper arm 30 in the radially inward direction is measured to meet a predetermined threshold by load cell 42, load cell 42 can generate a treatment signal. The treatment signal can actuate a treatment trigger. The treatment trigger in turn can deliver a treatment system 44 to internal bore 12 of tubular member 10.

Figure 3:
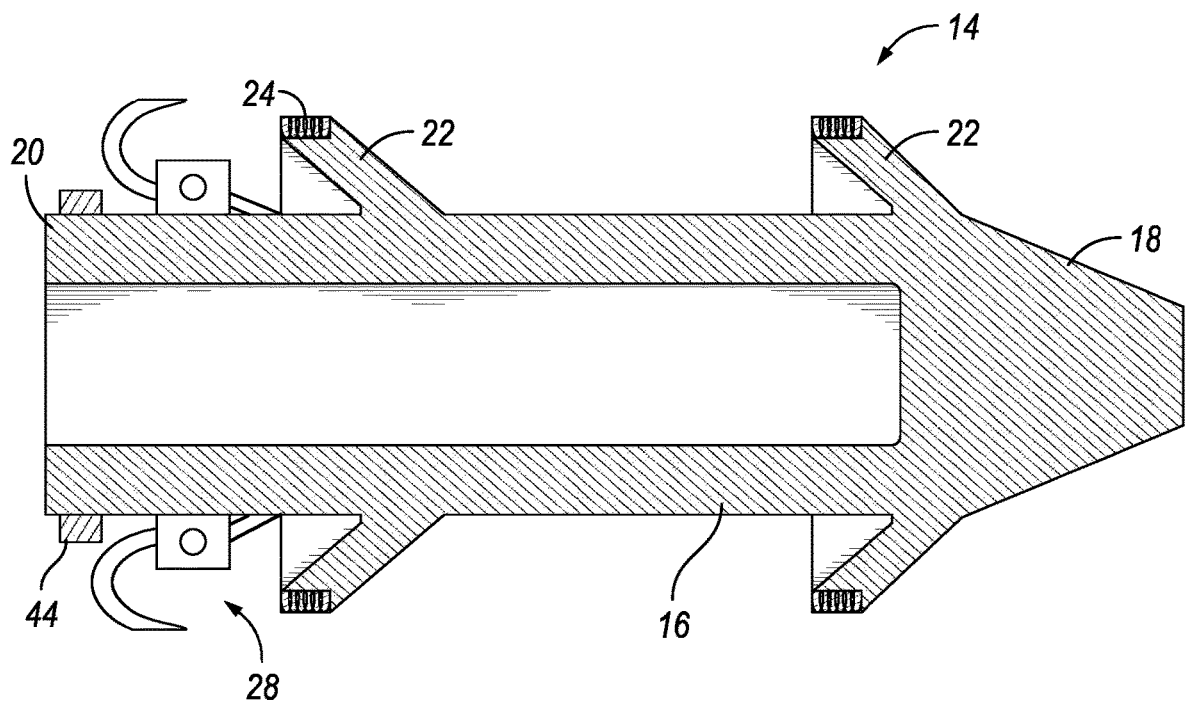
FIG. 3 is a section view of a pipeline pig, in accordance with an alternate embodiment of this disclosure.

Treatment system 44 is shown schematically in FIGS. 1-3. Treatment system 44 can be, for example, a chemical treatment that is positioned on pipeline pig 14. The chemical treatment can be selected based on the expected composition of deposit 26. The chemical treatment can be a chemical that is known to break down deposit 26 to reduce deposit 26. When treatment system 44 is a chemical treatment, the treatment trigger can release the chemical into internal bore 12 of tubular member 10 to break down deposit 26 so that deposit 26 can be removed from internal bore 12 of tubular member 10. In embodiments of this disclosure, the released chemical can include, for example, acids, a chelating agent, an oxidation agent, a thermochemical agent, or any combination of such chemicals. In alternate embodiments, the released chemical can be, for example, any currently available chemical or polymer that can aid in the treatment of the deposit 26.

In alternate embodiments, treatment system 44 can be, for example, a mechanical device. The size and shape of the mechanical device can be selected based on the expected composition of deposit 26. The mechanical device can be, for example, a mill or brush that is operable to extend to the surface of internal bore 12 of tubular member 10. The type of mill or brush can be selected as one that is known to break down deposit 26 to reduce deposit 26. When treatment system 44 is a mechanical device, the treatment trigger can cause the mechanical device to extend radially outward to break down deposit 26 so that deposit 26 can be removed from internal bore 12 of tubular member 10.

In yet other alternate embodiments, treatment system 44 can be, for example, a thermal system. The type and temperature of the thermal system can be selected as one that is known to break down deposit 26 to reduce deposit 26. When treatment system 44 is a thermal system, the treatment trigger can cause the thermal system to heat deposit 26 so that deposit 26 can be removed from internal bore 12 of tubular member 10.

When movement of scraper arm 30 in the radially inward direction is measured to meet a predetermined threshold by load cell 42, load cell 42 can alternately generate a positioning signal. The positioning signal actuates global positioning system 46 (FIG. 4). Global positioning system 46 identifies the position of pipeline pig 14 within tubular member 10. In addition to identifying the position of pipeline pig 14 within tubular member 10, load cell 42 can also provide data that identifies a thickness of deposit 26 at such location. In alternate embodiments, a sample of deposit 26 at such location can be gathered by pipeline pig 14 for further analysis after retrieval of pipeline pig 14 from tubular member 10.

In an example of operation in order to clean internal bore 12 of tubular member 10, pipeline pig 14 can be delivered into internal bore 12. Pipeline pig 14 can travel along a length of tubular member 10. Outer diameter lip 24 of cup 22 can engage the inner surface of internal bore 12, removing a certain amount of deposits 26. Scraper assembly 28 can remove more of the deposits 26. A scraper arm 30 of scraper assembly 28 can be biased radially outward by spring 38 to remove deposits 26. Load cell 42 that is positioned along spring 38 can detect movement of scraper arm 30 in a radially inward direction.

When load cell 42 detects a predetermined amount of movement of scraper arm 30 in a radially inward direction, a treatment system 44 can be actuated to treat the deposits 26. A global positioning system 46 can alternately be actuated to deliver a position of pipeline pig 14 along the length of tubular member 10.

Embodiments of this disclosure therefore provide systems and methods for removing deposits from a bore of a pipeline with a pipeline pig that has scrapers that can be retracted so that the scrapers are not broken off and do not cause the pipeline pig to become stuck. The system can treat the deposits without operator intervention and will treat only certain targeted length of the pipeline. This will reduce wasting treatments on regions of the pipeline that do not require treatment. The system and methods can also use a global positioning system to identify regions within the pipeline that have particularly thick or hard deposits.

Embodiments of the disclosure described herein, therefore, are well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A pipeline pig for traveling through a tubular member, the pipeline pig including:
　a pig body, the pig body sized to fit within an internal bore of the tubular member, the pig body further having a fore end pointed in a direction of travel through the tubular member, and an aft end opposite the fore end;
　a cup circumscribing the pig body, where an outer diameter lip of the cup is sized to engage a surface of the internal bore of the tubular member;
　a scraper assembly circumscribing the pig body, the scraper assembly having:

a scraper arm extending radially outward from the pig body;

a spring biasing the scraper arm in a radially outward direction;

a load cell positioned to measure a movement of the scraper arm in a radially inward direction; and a treatment trigger, the treatment trigger actuated by a treatment signal from the load cell to deliver a treatment system to the internal bore of the tubular member, where the treatment signal from the load cell is generated by the movement of the scraper arm in the radially inward direction.

2. The pipeline pig of claim 1, where the scraper assembly further includes a global positioning system, the global positioning system operable to identify a position of the pipeline pig within the tubular member; where the global positioning system identifies the position of the pipeline pig within the tubular member by a positioning signal from the load cell; where the positioning signal from the load cell is generated by the movement of the scraper arm in the radially inward direction.

3. The pipeline pig of claim 1, further including a second cup circumscribing the pig body, where an outer diameter lip of the second cup is sized to engage the surface of the internal bore of the tubular member.

4. The pipeline pig of claim 3, where the scraper assembly is positioned between the cup and the second cup.

5. The pipeline pig of claim 3, where the scraper assembly is positioned aft of both the cup and the second cup.

6. The pipeline pig of claim 1, where the scraper arm has a curved shape, with a leading edge of the scraper arm pointed in a forward direction and having a scraper blade.

7. The pipeline pig of claim 6, where the scraper arm includes a wheel located at the leading edge of the scraper arm.

8. The pipeline pig of claim 1, where the treatment system includes a chemical positioned on the pipeline pig, the chemical operable to reduce a deposit within the internal bore of the tubular member.

9. The pipeline pig of claim 1, where the treatment system includes a mechanical device positioned on the pipeline pig, the mechanical device operable to reduce a deposit within the internal bore of the tubular member.

10. The pipeline pig of claim 9, where the mechanical device is a brush or mill that is operable to extend to the surface of the internal bore of the tubular member.

11. A method for cleaning an internal bore of a tubular member with a pipeline pig, the method including:

delivering the pipeline pig into the internal bore of the tubular member, the pipeline pig having a pig body sized to fit within the internal bore of the tubular member;

pointing a fore end of the pig body in a direction of travel through the tubular member, where the pig body has an aft end opposite the fore end;

engaging a surface of the internal bore of the tubular member with an outer diameter lip of a cup that circumscribes the pig body;

removing a deposit within the internal bore of the tubular member with a scraper assembly that circumscribes the pig body, the scraper assembly having:

a scraper arm extending radially outward from the pig body;

a spring biasing the scraper arm in a radially outward direction;

a load cell positioned to measure a movement of the scraper arm in a radially inward direction; and a treatment trigger, the treatment trigger actuated by a treatment signal from the load cell to deliver a treatment system to the internal bore of the tubular member, where the treatment signal from the load cell is generated by the movement of the scraper arm in the radially inward direction.

12. The method of claim 11, where the scraper assembly further includes a global positioning system, the global positioning system identifying a position of the pipeline pig within the tubular member; where the global positioning system identifies the position of the pipeline pig within the tubular member by a positioning signal from the load cell; where the positioning signal from the load cell is generated by the movement of the scraper arm in the radially inward direction.

13. The method of claim 11, further including a second cup circumscribing the pig body, where an outer diameter lip of the second cup engages the surface of the internal bore of the tubular member.

14. The method of claim 13, further including positioning the scraper assembly between the cup and the second cup.

15. The method of claim 13, further including positioning the scraper assembly aft of both the cup and the second cup.

16. The method of claim 11, where the scraper arm has a curved shape, and the method further includes pointing a leading edge of the scraper arm in a forward direction; where the leading edge has a scraper blade.

17. The method of claim 16, where the scraper arm includes a wheel located at the leading edge of the scraper arm and the method further includes engaging the surface of the internal bore of the tubular member with the wheel.

18. The method of claim 11, where the treatment system includes a chemical positioned on the pipeline pig, the chemical reducing the deposit within the internal bore of the tubular member when the chemical is released into the internal bore of the tubular member.

19. The method of claim 11, where the treatment system includes a mechanical device positioned on the pipeline pig, the mechanical device reducing the deposit within the internal bore of the tubular member when the treatment system is delivered to the internal bore of the tubular member.

20. The method of claim 19, where the mechanical device is a brush or mill that extends to the surface of the internal bore of the tubular member.

* * * * *